(12) United States Patent
Gallenkamp et al.

(10) Patent No.: US 12,545,661 B2
(45) Date of Patent: Feb. 10, 2026

(54) PROCESS FOR PREPARING A TETRAZOLE-SUBSTITUTED ANTHRANILIC ACID DIAMIDE DERIVATIVE

(71) Applicant: Bayer Aktiengesellschaft, Leverkusen (DE)

(72) Inventors: Daniel Gallenkamp, Wuppertal (DE); Edith Beckmann, Cologne (DE); Ute Elias, Leverkusen (DE); Dirk Havekost, Cologne (DE); Michal Sowa, Wuppertal (DE); Britta Olenik, Bottrop (DE)

(73) Assignee: BAYER AKTIENGESELLSCHAFT (DE)

( * ) Notice: Subject to any disclaimer, the term of this patent is extended or adjusted under 35 U.S.C. 154(b) by 507 days.

(21) Appl. No.: 18/024,722

(22) PCT Filed: Sep. 2, 2021

(86) PCT No.: PCT/EP2021/074248
§ 371 (c)(1),
(2) Date: Mar. 3, 2023

(87) PCT Pub. No.: WO2022/049186
PCT Pub. Date: Mar. 10, 2022

(65) Prior Publication Data
US 2023/0339899 A1    Oct. 26, 2023

(30) Foreign Application Priority Data
Sep. 4, 2020   (EP) .................................. 20194636

(51) Int. Cl.
*C07D 401/14*   (2006.01)

(52) U.S. Cl.
CPC ........ *C07D 401/14* (2013.01); *C07B 2200/13* (2013.01)

(58) Field of Classification Search
None
See application file for complete search history.

(56) References Cited

U.S. PATENT DOCUMENTS 8,324,390 B2   12/2012   Fischer et al.
8,969,572 B2 *   3/2015   Pazenok ................. A61P 33/00
                                                                546/268.4

(Continued)

FOREIGN PATENT DOCUMENTS

WO   2010069502 A2   6/2010
WO   2010069502 A3   12/2010

(Continued)

OTHER PUBLICATIONS

Caira, M.R. (1998). "Crystalline Polymorphism of Organic Compounds," in Design of Organic Solids. Topics in Current Chemistry, 198:163-208.

*Primary Examiner* — Jeffrey S Lundgren
*Assistant Examiner* — Anthony Joseph Seitz
(74) *Attorney, Agent, or Firm* — MORRISON & FOERSTER LLP

(57) ABSTRACT

The present invention relates to a process for preparing a tetrazole-substituted anthranilic acid diamide derivative according to formula (I)

(Continued)

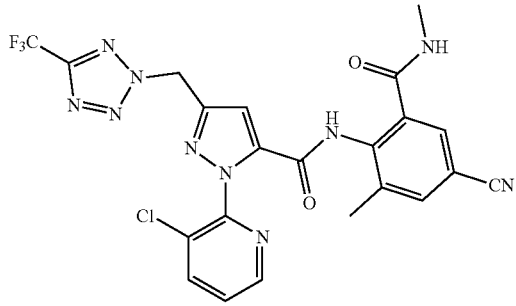

(I)

in crystalline form via solvate crystals in high purity and high yield. The present invention also further relates to the provision of novel solvate crystals which are distinguished by improved filtration properties compared to a tetrazole-substituted anthranilic acid diamide derivative according to the abovementioned formula (I) in crystalline form.

17 Claims, 8 Drawing Sheets

(56) References Cited

U.S. PATENT DOCUMENTS 9,056,861 B2* 6/2015 Pazenok .............. C07D 401/14
2012/0101133 A1* 4/2012 Pazenok .............. C07D 401/14
546/275.4

FOREIGN PATENT DOCUMENTS

WO 2011157664 A1 12/2011
WO 2019224678 A1 11/2019

* cited by examiner

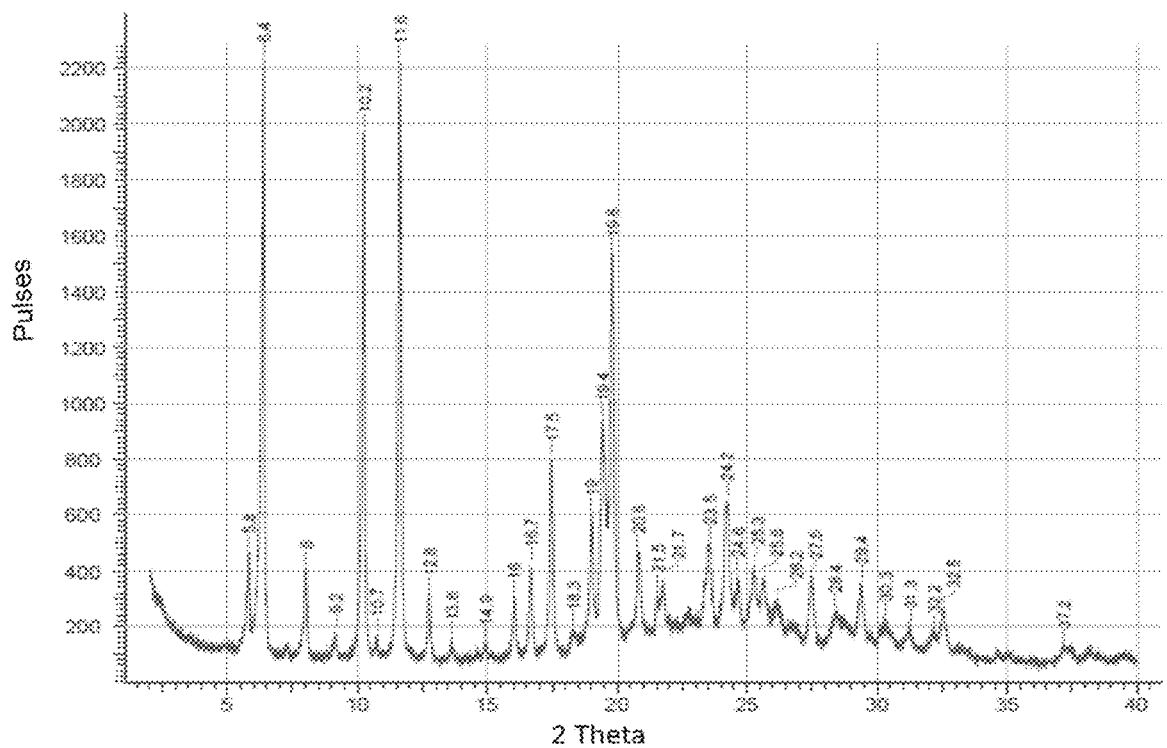
Figure 1: x-ray powder diffractogram of the crystalline form

Figure 2: Raman spectrum of the crystalline form
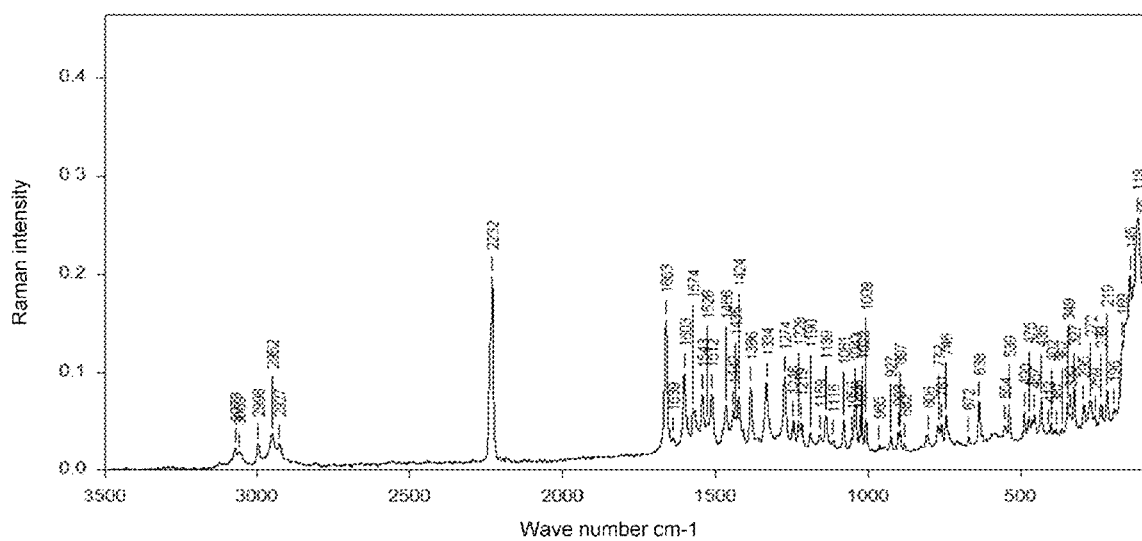

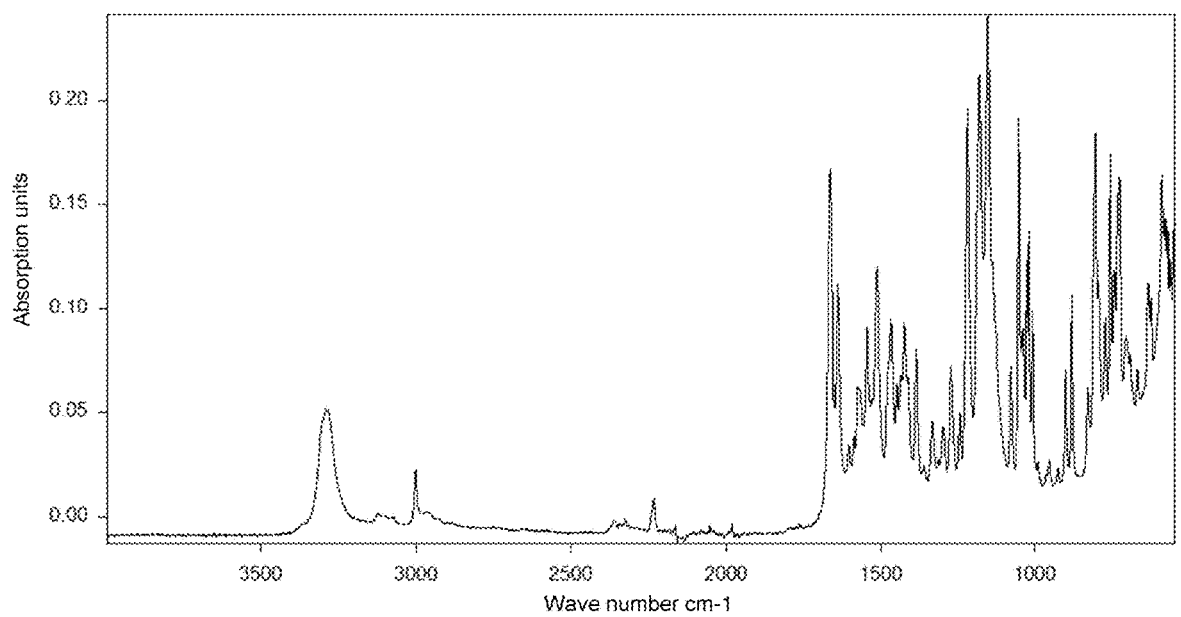
Figure 3: IR spectrum of the crystalline form

Figure 4: x-ray powder diffractogram of the DMAc solvate
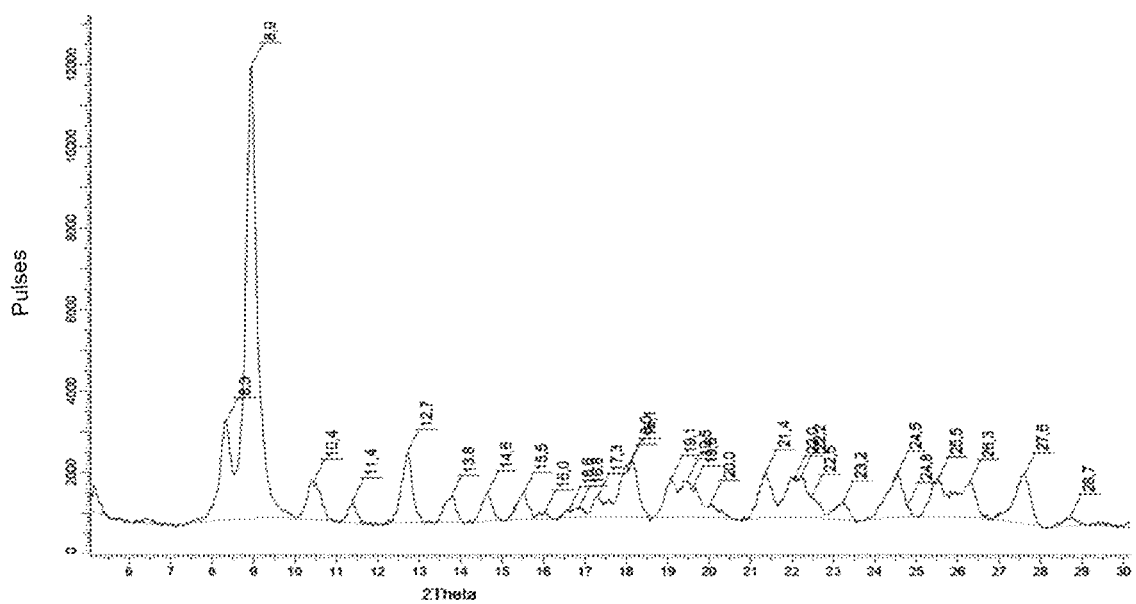

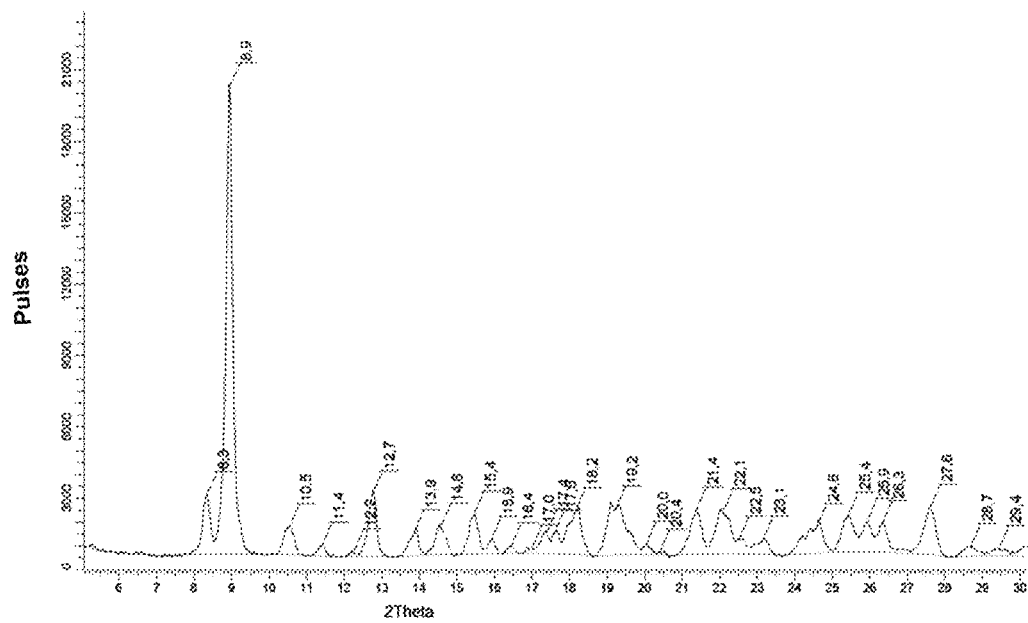
Figure 5: x-ray powder diffractogram of the NMP solvate

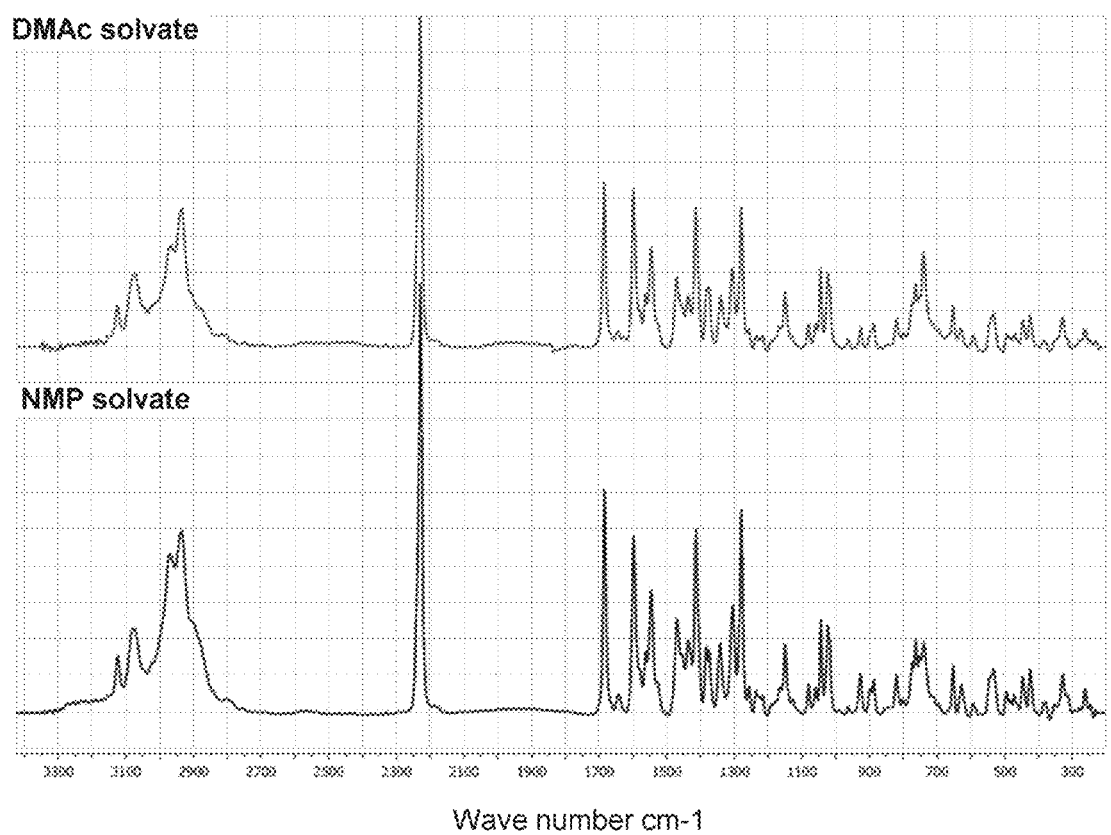
Figure 6: Raman spectra of the DMAc and NMP solvate

Figure 7: IR spectrum of the DMAc solvate
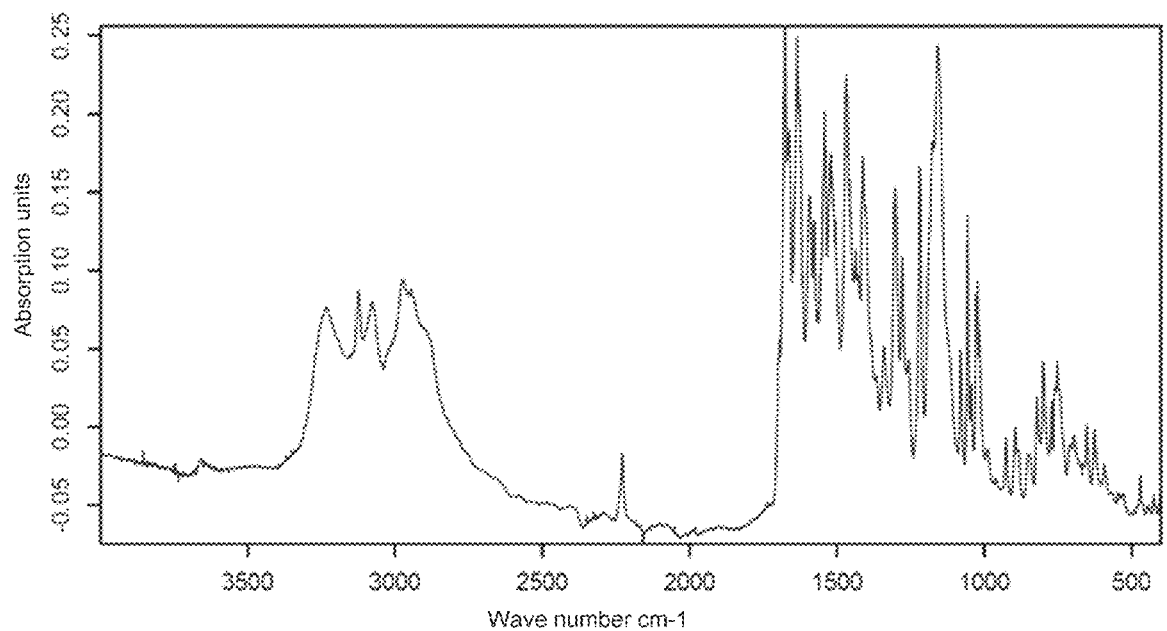

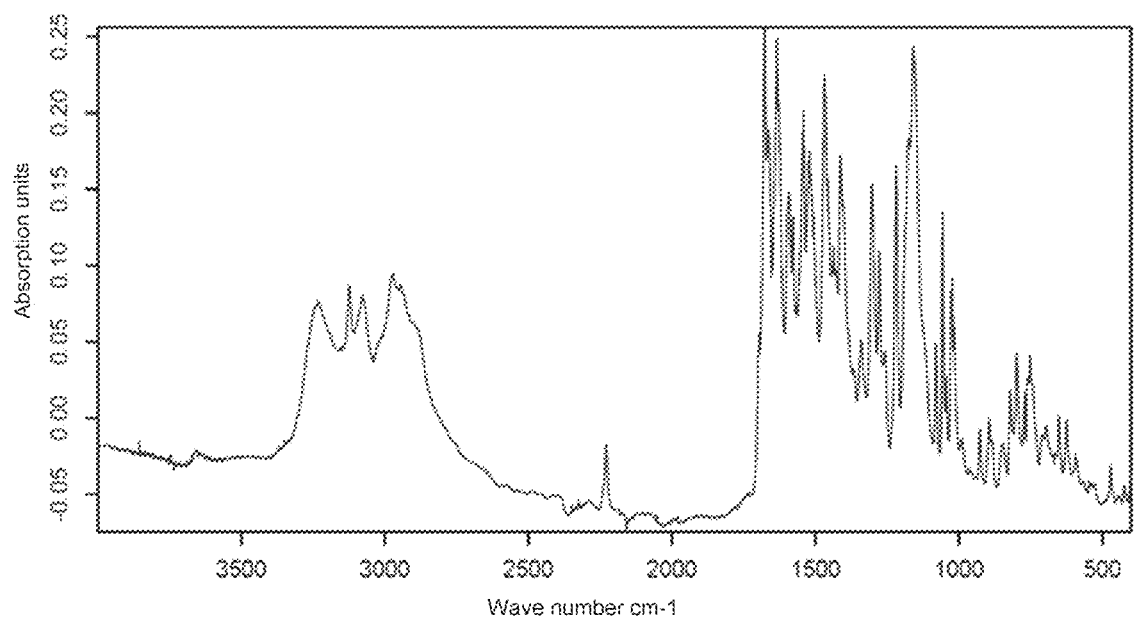
Figure 8: IR spectrum of the NMP solvate

PROCESS FOR PREPARING A TETRAZOLE-SUBSTITUTED ANTHRANILIC ACID DIAMIDE DERIVATIVE

CROSS REFERENCE TO RELATED APPLICATIONS

This application is a national stage application under 35 U.S.C. § 371 of International Application No. PCT/EP2021/074248, filed internationally on Sep. 2, 2021, which claims priority to and the benefit of European Application No. 20194636.5, filed Sep. 4, 2020.

The present invention relates to a process for preparing a tetrazole-substituted anthranilic acid diamide derivative according to formula (I)

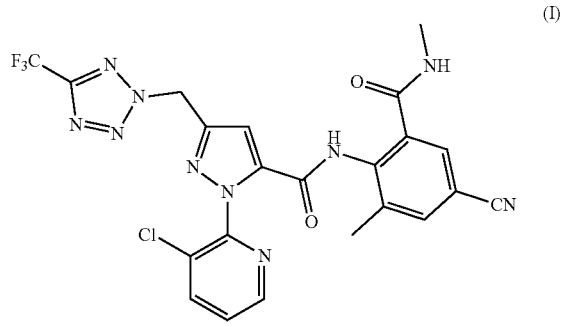 [SMILES: CNC(=O)c1cc(C#N)cc(C)c1NC(=O)c1cc(Cn2nnc(C(F)(F)F)n2)nn1-c1ncccc1Cl]

(I)

in crystalline form via solvate crystals in high purity and high yield. The present invention also further relates to novel solvent-solvate crystals which are distinguished by improved filtration properties compared to a tetrazole-substituted anthranilic acid diamide derivative according to the abovementioned formula (I) in crystalline form.

WO2011/157664 A1 describes a process for preparing tetrazole-substituted anthranilic acid diamide derivatives, inter alia also according to the abovementioned formula (I). WO2011/157664 A1 also describes a process for preparing a crystalline form of a tetrazole-substituted anthranilic acid diamide derivative according to the abovementioned formula (I) which, on account of the physico-chemical properties thereof, is easy to handle and enables the production of a stable formulation.

The disadvantage of the process described in WO2011/157664 A1 is the physical properties of the therein described crystalline form of a tetrazole-substituted anthranilic acid diamide derivative according to the abovementioned formula (I) in terms of the filtration properties thereof. According to the process described in WO2011/157664 A1, the compound according to the abovementioned formula (I) precipitates in the form of fine needles which cause long filtration times and high residual moisture contents in the filter cake during isolation by filtration. The high residual moisture contents in the filter cake moreover lead to long drying times of the moist substance. Because of the described problems, the process described in WO2011/157664 A1 for preparing a tetrazole-substituted anthranilic acid diamide derivative according to the abovementioned formula (I) is not expedient for large-scale industrial production.

The object of the present invention is therefore that of providing a novel process for preparing a tetrazole-substituted anthranilic acid diamide derivative according to the abovementioned formula (I) in crystalline form with high purity and high yield, which is also advantageous in large-scale industrial production taking account of economic factors.

The object was achieved according to the present invention by a process for preparing a compound of formula (I)

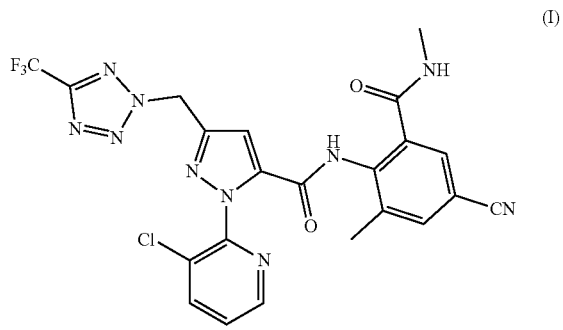 [SMILES: CNC(=O)c1cc(C#N)cc(C)c1NC(=O)c1cc(Cn2nnc(C(F)(F)F)n2)nn1-c1ncccc1Cl]

(I)

in crystalline form, characterized in that a compound of formula (I) is dissolved in at least one amide solvent and is crystallized to give a solvate by the presence of at least one antisolvent and/or by decreasing t The present invention also further relates to solvent-solvate crystals of the formula (I) formed in the process according to the invention that feature improved filtration properties compared to a tetrazole-substituted anthranilic acid diamide derivative of the abovementioned formula (I) in crystalline form as described in WO2011/157664 A1. The formation of the solvent-solvate crystals of the compound of the formula (I) is thus crucial for the economic viability of the process according to the invention and the performability thereof on an industrial production scale.

WO2011/157664 A1 does not describe solvent-solvate crystals, nor the possibility of their formation, nor their advantageous properties. It was surprisingly possible to obtain the solvent-solvate crystals from amidic solvents in the course of the process according to the invention, even though amidic solvents are known to be good solvents for the compounds of the formula (I).

What is also particularly surprising is that, in the course of the process according to the invention, the compound of the formula (I) can be obtained in its thermodynamically stable crystalline form by drying of the solvate crystals.

The crystalline form of the compound of the formula (I) obtained in the process according to the invention is preferably the thermodynamically stable crystal form.

Likewise preferably, the process of the invention affords a compound of the formula (I) in a crystalline form which has a characteristic X-ray powder diffractogram, Raman spectrum and IR spectrum (Table 1 and 2, FIGS. 1, 2, 3). A compound of the abovementioned formula (I) in this crystalline form is characterized in that the X-ray powder diffractogram thereof at a temperature of 25° C. and using Cu Kα radiation has at least the following reflections (2 theta): 5.8°, 6.4°, 11.6°, 17.5°, 19.8°, 20.8°, 23.5° and 24.2° (in each case±0.2°). Preferably, the X-ray powder diffractogram of the crystalline form at a temperature of 25° C. and using Cu Kα radiation has at least the following further reflections (2 theta): 10.2°, 12.8°, 16.7°, 19.0°, 25.3°, 27.5°, 29.4° (in each case±0.2°). In a further preferred variant of the present invention, the X-ray powder diffractogram of the crystalline form at a temperature of 25° C. and using Cu Kα radiation corresponds essentially to the diffractogram depicted in FIG. 1.

Particularly preferably, the Raman spectrum of the crystalline form has at least the following bands [cm$^{-1}$]: 2927, 1663, 1386, 1334, 1022, 638 (in each case±2° cm$^{-1}$). In a further particularly preferred embodiment of the invention, the Raman spectrum of the crystalline form corresponds essentially to the spectrum depicted in FIG. 2.

Particularly preferably, the IR spectrum of the crystalline form has at least the following bands [cm$^{-1}$]: 3286, 1662, 1219, 1181, 1154, 1055 (in each case±2° cm$^{-1}$). In a further particularly preferred embodiment of the invention, the IR spectrum of the crystalline form corresponds essentially to the spectrum depicted in FIG. 3.

All X-ray powder diffractometry data of the crystalline form were obtained with the following acquisition parameters at 25° C.:

Diffractometer type: PANalytic X'Pert PRO
Anode material: Cu
Radiation: Cu K$\alpha$ 1
Wavelength: 1.54060 Å
Scan mode: transmittance
Scan type: 2Theta: Omega
Range: 2 Theta (Peakmaximum)±0.2°

The Raman spectra of the crystalline form were recorded with FT Raman spectrometers from Bruker (e.g. with the models RFS100 or MultiRam) at 25° C. and with a laser wavelength of 1064 nm and a resolution of 2 cm$^{-1}$.

The IR spectra of the crystalline form were recorded with Bruker IR spectrometers (for example with the Tensor 37 model) having a universal diamond ATR unit at 25° C. and with a resolution of 4 cm$^{-1}$.

DESCRIPTION OF THE FIGURES

FIG. 1 shows the x-ray powder diffractogram of the crystalline form

FIG. 2 shows the Raman spectrum of the crystalline form

FIG. 3 shows the IR spectrum of the crystalline form

FIG. 4 shows the x-ray powder diffractogram of the DMAc solvate

FIG. 5 shows the x-ray powder diffractogram of the NMP solvate

FIG. 6 shows the Raman spectra of the DMAc and NMP solvate

FIG. 7 shows the IR spectrum of the DMAc solvate

FIG. 8 shows the IR spectrum of the NMP solvate

The starting point for the preparation of a compound of the abovementioned formula (I) in a crystalline form according to the present process is the presence of a reactant mixture in which a compound of the abovementioned formula (I) is dissolved in at least one amide solvent selected from the group of N,N-dimethylformamide, N,N-dimethylacetamide, N-methylformanilide, N-methyl-2-pyrrolidone, N-methylcaprolactam and hexamethylphosphoramide and very particularly preferably selected from the group of N,N-dimethylacetamide and N-methyl-2-pyrrolidone. In a further preferred embodiment of the invention, one amide solvent is present and not a mixture of the abovementioned amide solvents.

Using N,N-dimethylacetamide gives the crystalline N,N-dimethylacetamide solvate of the compound of formula (I) (DMAc solvate) described further below. Using N-methyl-2-pyrrolidone gives the crystalline N-methyl-2-pyrrolidone solvate of the compound of formula (I) (NMP solvate) described further below.

Compared to the compound of formula (I) in crystalline form, the DMAc solvate and the NMP solvate have considerably improved filtration properties (see Table 5). The filtration resistance a measured in Table 5 was measured by recording a pressure filtration curve. The filtration test was carried out in an apparatus for determining the specific filtration resistance (alpha value), according to VDI guideline 2762 (manufacturer: BHS Sonthofen, model: pocket measuring device KPL TMG 400). For this purpose, the suspension to be determined was introduced into the apparatus and the precipitating amount of filtrate (mother liquor) was continuously measured by the application of a pressure difference. The filtrate amount V is recorded as a function of the time t (filtrate curve). By plotting t/V against V, the specific filtration resistance (alpha value in m$^{-2}$) can be determined (see also W. Beckmann: Crystallization-Basic Concepts and Industrial Applications, Wiley-VCH, 2013, chapter 14.2.3).

The at least one amide solvent is preferably used in the reactant mixture in a 2- to 20-fold weight excess, particularly preferably in a 3- to 10-fold weight excess based on the compound of formula (I).

A compound of formula (I) in at least one amide solvent can be crystallized by decreasing the temperature to give the solvate, without addition of at least one antisolvent. The temperature decrease in this case is preferably carried out slowly, particularly preferably in a range from 1 to 10° C./hour and even more preferably in a range from 1 to 5° C./hour in the temperature range specified further below. The compound of formula (I) in at least one amide solvent is in this case preferably present in a homogeneous mixture, which can for example be achieved by stirring.

For the described process according to the invention, in a preferred embodiment of the invention at least one antisolvent is used, essentially in order to lower the solubility and achieve a higher yield of the solvate. The crystallization to give the solvate can then also be carried out without a temperature decrease or even overall at higher process temperatures. In a particularly preferred embodiment of the invention, for the crystallization to give the solvate, the presence or addition of at least one antisolvent and the (preferably subsequent) temperature decrease are combined with one another. As at least one antisolvent, an antisolvent selected from the group of water, acetonitrile, $C_1$-$C_6$ alcohols, toluene, xylene, esters of formic acid with $C_1$-$C_4$ alcohols and esters of acetic acid with $C_1$-$C_4$ alcohols is preferably used. Particularly preferably, at least one antisolvent selected from the group of water, acetonitrile, methanol, ethanol, isopropanol, 1-butanol, toluene and ethyl acetate is used. In a further preferred embodiment of the invention, one antisolvent is present and not a mixture of the abovementioned antisolvents.

In a further preferred embodiment of the invention, the weight ratio of the at least one amide solvent to the at least one antisolvent is between 10:1 and 1:1, particularly preferably between 5:1 and 2:1 and very particularly preferably approximately 4:1.

The at least one amide solvent may also already be diluted with the at least one antisolvent and the compound according to formula (I) in the reactant mixture, as long as the solvents used are inert under the reaction conditions and a homogeneous state is reached before the crystallization of the solvate, by for example correspondingly increasing the temperature.

Before the addition of the at least one antisolvent to the reactant mixture, those inert solvents which e.g. also passed into the reaction mixture with the solution of the compound of formula (II) may be removed by suitable means, e.g. by distillation, optionally under reduced pressure.

The solvate crystallization according to the above-described inventive process is preferably carried out at temperatures from −20 to +30° C. and particularly preferably at temperatures from −10 to +20° C., generally under standard pressure.

Alternatively, however, it is also possible to work under vacuum or under elevated pressure in an autoclave. The reaction time may, depending on the batch size, amide solvent(s), antisolvent(s) and the temperature, be selected within a range between one hour and several hours. The filtration may be carried out in a filtration apparatus known to those skilled in the art, for instance a pressurized suction filter or a centrifuge. The drying may be carried out in a drying apparatus known to those skilled in the art, for instance a horizontal or vertical mixer drier or a suction drier. The drying is carried out in a temperature range from 20 to 100° C., preferably in a temperature range from 60 to 80° C. The drying is carried out in a pressure range from 1 to 100 mbar, preferably in a pressure range from 5 to 20 mbar.

Preferably, the reactant mixture used for the above-described process consisting of a compound of the abovementioned formula (I) together with at least one amide solvent is prepared by a process in which a compound of formula (II)

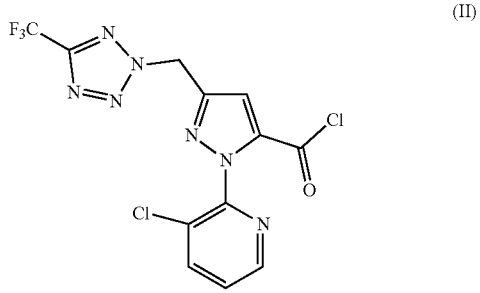 [SMILES: O=C(Cl)c1cc(Cn2nnc(C(F)(F)F)n2)nn1-c1ncccc1Cl]

is reacted with a compound of formula (III)

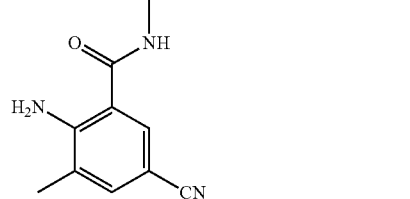

in the presence of an amide solvent.

The coupling reaction may optionally be performed in the presence of a catalyst. Examples include 4-dimethylaminopyridine or 1-hydroxybenzotriazole. Additional acid binders are not required for this reaction.

The coupling reaction is further preferably carried out such that the compound of formula (III) in the amide solvent is initially charged in equimolar amounts or with a slight excess of 1.0-1.2 molar equivalents based on the compound of formula (II). The compound of formula (II) is then metered in over a period of preferably 1 to 10 hours, preferably 2 to 5 hours, as solvent, preferably in an inert organic solvent or as melt at a temperature of preferably -10 to +50° C., particularly preferably 0 to 40° C., very particularly preferably 10 to 30° C. This reaction is generally carried out under standard pressure. Alternatively, however, it is also possible to work under vacuum or under elevated pressure in an autoclave. After the end of the post-reaction time, the inert solvent is preferably removed, as already described above.

As amide solvent for this coupling reaction, the same amide solvents are used as described above for the reactant mixture.

The compound of formula (II) may be used as solid or as melt for this coupling reaction. The use of the compound of formula (II) dissolved in an inert organic solvent is however preferable. In this context, the compound of formula (II) is dissolved in an inert organic solvent which is preferably selected from the group of aliphatic, alicyclic and aromatic hydrocarbons, for instance petroleum ether, hexane, heptane, cyclohexane, methylcyclohexane, benzene, toluene, xylene and decalin; halogenated hydrocarbons, for instance chlorobenzene, dichlorobenzene, dichloromethane, chloroform, tetrachloromethane, dichloroethane and trichloroethane; ethers such as diethyl ether, diisopropyl ether, methyl tert-butyl ether, methyl tert-amyl ether, dioxane, tetrahydrofuran, 1,2-dimethoxyethane, 1,2-diethoxyethane and anisole; ketones such as acetone, butanone, methyl isobutyl ketone and cyclohexanone; nitriles such as acetonitrile, propionitrile, n- or isobutyronitrile or benzonitrile; amides such as N,N-dimethylformamide, N,N-dimethylacetamide, N-methylformanilide, N-methylpyrrolidone and hexamethylphosphoramide, and also the mixtures thereof. Particular preference is given to the use of toluene.

Compounds of formula (III) are known or can be prepared by general synthesis methods (cf. for example Baker et al. *J. Org. Chem.* 1952, 149-153; G. Reissenweber et al., *Angew. Chem* 1981, 93, 914-915, P. J. Montoya-Pelaez, *J. Org. Chem.* 2006, 71, 5921-5929; F. E. Sheibley, *J. Org. Chem.* 1938, 3, 414-423, WO 2006023783 A1).

In a preferred embodiment of the invention, a compound of formula (II) is prepared by a compound of formula (IV)

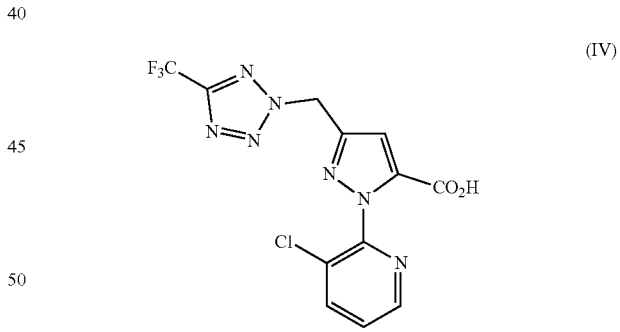

being reacted with an acid halide former selected from the group of phosgene, phosphorus tribromide, phosphorus trichloride, phosphorus pentachloride, phosphorus oxychloride and thionyl chloride in the presence of an inert organic solvent.

The acid halide former is preferably selected from the group of phosgene, mesyl chloride and thionyl chloride. Particular preference is given to thionyl chloride.

As inert organic solvent, the inert organic solvents already mentioned above for the preparation of the reactant mixture starting from the compounds of formula (II) and (III) are used. Particular preference is given to the use of toluene.

This process step is preferably carried out at temperatures from +20 to +100° C. and particularly preferably at temperatures from +50 to +75° C., generally under standard pressure. Depending on the batch size, reactants used and temperature, the reaction time lies in a range between one hour and five hours, preferably between one hour and three hours.

The pyrazolecarboxylic acids of formula (IV) are known or can be obtained by known processes (cf., for example, WO2011/157664 A1). Because of the tetrazole group, pyrazolecarboxylic acids of formula (IV) are generally present as mixtures of different regioisomers.

A further subject of the present invention relates to a crystalline N,N-dimethylacetamide solvate of a compound of formula (I)

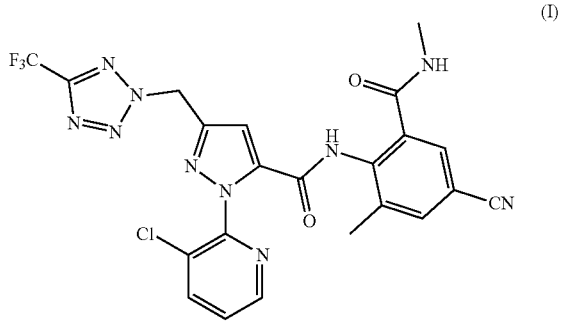 [SMILES: CNC(=O)c1cc(C#N)cc(C)c1NC(=O)c1cc(Cn2nnc(C(F)(F)F)n2)nn1-c1ncccc1Cl]

(I)

which has at least the following reflections in the X-ray powder diffractogram at a temperature of 25° C. using Cu Kα radiation: 8.3, 8.9, 14.6, particularly preferably has at least the following reflections: 8.3, 8.9, 10.4, 14.6, 15.5, very particularly preferably has at least the following reflections: 8.3, 8.9, 10.4, 12.7, 14.6, 15.5, 27.6 (specified as 2 theta/° value±0.2°). Preferably, the inventive crystalline N,N-dimethylacetamide solvate of a compound of formula (I) (abbreviated to DMAc solvate) has the reflections (2 theta) specified in Table 3. The X-ray powder diffractogram of the DMAc solvate is also shown in FIG. 4.

A further subject of the present invention relates to a crystalline N-methyl-2-pyrrolidone solvate of a compound of formula (I)

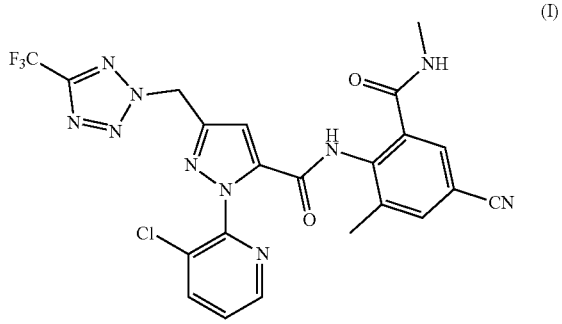 [SMILES: CNC(=O)c1cc(C#N)cc(C)c1NC(=O)c1cc(Cn2nnc(C(F)(F)F)n2)nn1-c1ncccc1Cl]

(I)

which at least has the following reflections in the X-ray powder diffractogram at a temperature of 25° C. using Cu Kα radiation: 8.3, 8.9, 14.6, particularly preferably has at least the following reflections: 8.3, 8.9, 10.5, 14.6, 15.4, very particularly preferably has at least the following reflections: 8.3, 8.9, 10.5, 12.7, 14.6, 15.4, 27.6 (specified as 2 theta/° value±0.2°). Preferably, the inventive crystalline N-methyl-2-pyrrolidone solvate of a compound of formula (I) (abbreviated to NMP solvate) has the reflections (2 theta) specified in Table 3. The X-ray powder diffractogram of the NMP solvate is also shown in FIG. 5.

All X-ray powder diffractometry data for DMAc and NMP solvate were measured on a Bruker D2 PHASER diffractometer with a LynxEye detector, using Cu Kα radiation of wavelength 1.5418 Å at 25° C. The data were recorded in a horizontal Bragg-Brentano (θ/2θ) geometry between 5 and 30° (2θ) in 0.0264119° steps at 0.5 s/step. The X-ray tube was operated at 30 kV and 10 mA. All X-ray reflections are specified as 2Θ (theta) values (peak maxima) with a resolution of ±0.2°.

The crystalline N,N-dimethylacetamide solvate and the crystalline N-methyl-2-pyrrolidone solvate of a compound of formula (I) can furthermore be characterized by IR and Raman spectroscopy. The corresponding Raman and IR spectra are depicted in FIGS. 6, 7 and 8.

All Raman spectra of the solvates were recorded with a Kaiser Raman RXN2 spectrometer at 25° C. using a fibre-coupled probe for in-situ detection. The system used was equipped with an MR probe for contactless determination. An NIR Kaiser Invictus Laser (785 nm) with an emission of 450 mW was used. The spectral range of this system covers +100 to +3425 $cm^{-1}$ at a resolution of 4 $cm^{-1}$. The iC Raman Software from Mettler Toledo was used for configuration of the instruments, data recording and data evaluation.

The IR spectra of the solvates were recorded by FTIR analysis in the spectral range from 400 to 4000 $cm^{-1}$ with a Bruker Platinum ATR tensor II and a resolution of 4 $cm^{-1}$. The Opus Software from Bruker was used for configuration of the instruments, data recording and data evaluation.

The IR and Raman spectra of the DMAc and NMP solvates contain the bands which are listed in Table 4.

Preferably, the Raman spectrum of the DMAc solvate has at least the following characteristic bands: 3126, 1685, 1340, particularly preferably the following bands: 3126, 3026, 1685, 1340, 1306, very particularly preferably the following bands: 3126, 3026, 2972, 1685, 1340, 1306, 963 (specified as band [$cm^{-1}$]; in each case±2° $cm^{-1}$).

Preferably, the IR spectrum of the DMAc solvate has at least the following characteristic bands: 3234, 1525, 926, particularly preferably the following bands: 3234, 3124, 1525, 1496, 926, very particularly preferably the following bands: 3234, 3124, 3078, 1525, 1496, 1016, 926 (specified as band [$cm^{-1}$]; in each case±2° $cm^{-1}$).

Preferably, the Raman spectrum of the NMP solvate has at least the following characteristic bands: 3125, 1684, 1342, particularly preferably the following bands: 3125, 3024, 1684, 1342, 1305, very particularly preferably the following bands: 3125, 3024, 2973, 1684, 1342, 1305, 963 (specified as band [$cm^{-1}$]; in each case±2° $cm^{-1}$).

Preferably, the IR spectrum of the NMP solvate has at least the following characteristic bands: 3234, 1525, 926, particularly preferably the following bands: 3234, 3124, 1525, 926, 848, very particularly preferably the following bands: 3234, 3124, 3078, 1525, 1016, 926, 848 (specified as band [$cm^{-1}$]; in each case±2° $cm^{-1}$).

The inventive process, by means of which, inter alia, the novel crystalline DMAc and NMP solvates of the compound of formula (I) are obtained, is described in more detail below:

PREPARATION EXAMPLES

The Preparation Examples which follow illustrate the invention without limiting it.

Example 1

Isomer Mixture of 1-(3-chloropyridin-2-yl)-3-[(5-(trifluoromethyl)-2H-tetrazol-2-yl)methyl]-1H-pyrazole-5-carbonyl chloride (main isomer) and 1-(3-chloropyridin-2-yl)-3-{[5-(trifluoromethyl)-1H-tetrazol-1-yl]methyl}-1H-pyrazole-5-carbonyl chloride (secondary component)

50.0 g of 1-(3-chloropyridin-2-yl)-3-[(5-(trifluoromethyl)-2H-tetrazol-2-yl)methyl]-1H-pyrazole-5-carboxylic acid and 1-(3-chloropyridin-2-yl)-3-{[5-(trifluoromethyl)-1H-tetrazol-1-yl]methyl}-1H-pyrazole-5-carboxylic acid as 95:5 isomer mixture were initially charged in 200.0 g of toluene and heated to 75° C. 17.1 g of thionyl chloride were metered in within 1 h and the mixture was subsequently stirred for 1 h at 75° C. After the reaction had ended, the excess thionyl chloride was distilled off together with a partial amount of toluene at 70° C. and 150 mbar (27.0 g distillate). The solution was made up to a total weight of 240.0 g with fresh toluene in order to obtain an approximately 20 wt % solution of the product as 95:5 isomer mixture which was thus used in the next step.

Example 2

Isomer Mixture of 1-(3-chloropyridin-2-yl)-N-[4-cyano-2-methyl-6-(methylcarbamoyl)phenyl]-3-[(5-(trifluoromethyl)-2H-tetrazol-2-yl)methyl]-1H-pyrazole-5-carboxamide (main isomer) and 1-(3-chloropyridin-2-yl)-N-[4-cyano-2-methyl-6-(methylcarbamoyl)phenyl]-3-{[5-(trifluoromethyl)-1H-tetrazol-1-yl]methyl}-1H-pyrazole-5-carboxamide (Secondary Component)

a) Preparation of a Solution of 1-(3-chloropyridin-2-yl)-N-[4-cyano-2-methyl-6-(methylcarbamoyl)phenyl]-3-[(5-(trifluoromethyl)-2H-tetrazol-2-yl)methyl]-1H-pyrazole-5-carboxamide and isomer in N,N-dimethylacetamide (DMAc)

25.3 g of 2-amino-5-cyano-N-3-dimethylbenzamide were dissolved in 123.0 g DMAc and subsequently distilled off at 65° C. and 20 mbar, 20.0 g DMAc. The mixture was cooled to 10-15° C. and the previously prepared 20% solution of 1-(3-chloropyridin-2-yl)-3-[(5-(trifluoromethyl)-2H-tetrazol-2-yl)methyl]-1H-pyrazole-5-carbonyl chloride and isomer were metered in within 1 h and subsequently stirred after the addition had ended for 3 h at 10-15° C. Subsequently, toluene was distilled off at 45-50° C. and 30 mbar and this gave an approximately 35% w/w solution of 1-(3-chloropyridin-2-yl)-N-[4-cyano-2-methyl-6-(methylcarbamoyl)phenyl]-3-[(5-(trifluoromethyl)-2H-tetrazol-2-yl)methyl]-1H-pyrazole-5-carboxamide and the corresponding isomer in DMAc.

b) Preparation of the DMAc Solvate of 1-(3-chloropyridin-2-yl)-N-[4-cyano-2-methyl-6-(methylcarbamoyl)phenyl]-3-[(5-(trifluoromethyl)-2H-tetrazol-2-yl)methyl]-1H-pyrazole-5-carboxamide and isomer The approximately 35% w/w solution of 1-(3-chloropyridin-2-yl)-N-[4-cyano-2-methyl-6-(methylcarbamoyl)phenyl]-3-[(5-(trifluoromethyl)-2H-tetrazol-2-yl)methyl]-1H-pyrazole-5-carboxamide in DMAc was cooled to 25-30° C. and 27.0 g of methanol were added within 10 minutes. The mixture was cooled over a period of 2 h to 0-5° C. and subsequently stirred for 1 h. A crystal sample of the suspension showed lozenge-shaped DMAc solvate crystals under a light microscope. The DMAc solvate obtained showed the XRPD reflections described in Table 3 and FIG. 4, and the Raman and IR spectra specified in Table 4 and FIGS. 6 and 7.

c) Isolation of the DMAc Solvate of 1-(3-chloropyridin-2-yl)-N-[4-cyano-2-methyl-6-(methylcarbamoyl)phenyl]-3-[(5-(trifluoromethyl)-2H-tetrazol-2-yl)methyl]-1H-pyrazole-5-carboxamide and isomer and Drying To complete the yield, 30.0 g of water were added within 10 minutes to the above suspension and subsequently stirred for 1 h at 0-5° C. The solid was filtered off using a suction filter, washed at 0-5° C. with a mixture of 50.0 g of DMAc and 50.0 g of water, and the moist filter cake was dried at 80° C. and 10 mbar. 66.0 g of the product (89% yield) was obtained as 95:5 isomer mixture with a purity of 95% and in crystalline form. The crystalline form obtained showed the characteristic x-ray powder diffractogram specified in Table 1 and FIG. 1 and the Raman and IR spectra specified in Table 2 and FIGS. 2 and 3.

Example 3

Preparation of the DMAc solvate of 1-(3-chloropyridin-2-yl)-N-[4-cyano-2-methyl-6-(methylcarbamoyl)phenyl]-3-[(5-(trifluoromethyl)-2H-tetrazol-2-yl)methyl]-1H-pyrazole-5-carboxamide and isomer using alternative antisolvents, optionally without use of an antisolvent 175.0 g of the 35% w/w solution of 1-(3-chloropyridin-2-yl)-N-[4-cyano-2-methyl-6-(methylcarbamoyl)phenyl]-3-[(5-(trifluoromethyl)-2H-tetrazol-2-yl)methyl]-1H-pyrazole-5-carboxamide and isomer in DMAc, prepared according to Example 2a, were cooled to 30° C. 27.0 g of one of the following solvents, or alternatively of a mixture of the following solvents, was added within 10 min: ethanol, 2-propanol, 1-butanol, toluene, xylene, ethyl acetate or isopropyl acetate. Optionally, no antisolvent was added. The batch was then cooled to 0-5° C. within 2 h and subsequently stirred for 1 h. Optionally, the solution was seeded by addition of a small amount of solvate in order to initiate crystallization. A crystal sample of the suspension also showed lozenge-shaped DMAc solvate crystals under a light microscope. The DMAc solvate obtained showed the XRPD reflections described in Table 3 and FIG. 4 and the Raman and IR spectra specified in Table 4 and FIGS. 6 and 7.

Example 4

Preparation of the NMP Solvate of 1-(3-chloropyridin-2-yl)-N-[4-cyano-2-methyl-6-(methylcarbamoyl)phenyl]-3-[(5-(trifluoromethyl)-2H-tetrazol-2-yl)methyl]-1H-pyrazole-5-carboxamide and isomer and Drying 114.0 g of a 35% w/w solution of 1-(3-chloropyridin-2-yl)-N-[4-cyano-2-methyl-6-(methylcarbamoyl)phenyl]-3-[(5-(trifluoromethyl)-2H-tetrazol-2-yl)methyl]-1H-pyrazole-5-carboxamide and isomer in NMP, prepared according to Example 2a, were cooled to 30° C. 17.0 g of methanol were added within 10 minutes. The mixture was cooled over a period of 2 h to 0-5° C. and subsequently stirred for 1 h. A crystal sample of the suspension showed lozenge-shaped NMP solvate crystals under a light microscope. The NMP solvate obtained showed the XRPD reflections described in Table 3 and FIG. 5 and the Raman and IR spectra specified in Table 4 and FIGS. 6 and 8.

The solid was filtered off using a suction filter and the moist filter cake was dried at 80° C. and 10 mbar. 31.4 g of the product were obtained as a 95:5 isomer mixture in crystalline form. The crystalline form obtained showed the characteristic X-ray powder diffractogram specified in Table 1 and FIG. 1, and the Raman and IR spectra specified in Table 2 and FIGS. 2 and 3.

The solvate samples for the X-ray powder diffractometry, IR and Raman analyses were provided according to methods known to those skilled in the art.

TABLE 1

X-ray powder diffractometry
Reflections [° 2 theta]
Crystalline form

| |
|---|
| 5.8 |
| 6.4 |
| 8.0 |
| 9.2 |
| 10.2 |
| 10.7 |
| 11.6 |
| 12.8 |
| 13.6 |
| 14.9 |
| 16.0 |
| 16.7 |
| 17.5 |
| 18.3 |
| 19.0 |
| 19.4 |
| 19.8 |
| 20.8 |
| 21.5 |
| 21.7 |
| 23.5 |
| 24.2 |
| 24.6 |
| 25.3 |
| 25.6 |
| 26.2 |
| 27.5 |
| 28.4 |
| 29.4 |
| 30.3 |
| 31.3 |
| 32.2 |
| 32.5 |
| 37.2 |

TABLE 2

IR and Raman bands

| Crystalline form IR bands [cm$^{-1}$] | Crystalline form Raman bands [cm$^{-1}$] |
|---|---|
| 3286 | 3073 |
| 3124 | 3059 |
| 3074 | 2998 |
| 3001 | 2952 |
| 2231 | 2927 |
| 1662 | 2232 |
| 1637 | 1663 |
| 1602 | 1639 |
| 1585 | 1603 |
| 1574 | 1574 |
| 1567 | 1543 |
| 1543 | 1528 |
| 1527 | 1512 |
| 1511 | 1466 |
| 1466 | 1442 |
| 1447 | 1435 |
| 1434 | 1424 |
| 1424 | 1386 |
| 1411 | 1334 |
| 1385 | 1274 |
| 1361 | 1246 |
| 1333 | 1229 |
| 1314 | 1219 |
| 1298 | 1190 |
| 1274 | 1159 |
| 1245 | 1139 |
| 1219 | 1116 |
| 1181 | 1081 |
| 1154 | 1056 |
| 1081 | 1043 |
| 1055 | 1029 |
| 1041 | 1022 |
| 1029 | 1009 |
| 1022 | 965 |
| 1009 | 927 |
| 991 | 903 |
| 964 | 897 |
| 955 | 882 |
| 927 | 806 |
| 902 | 772 |
| 882 | 761 |
| 830 | 746 |
| 806 | 672 |
| 796 | 638 |
| 774 | 554 |
| 758 | 539 |
| 745 | 490 |
| 729 | 475 |
| 707 | 457 |
| 693 | 435 |
| 670 | 412 |
| 635 | 402 |
| 626 | 387 |
| 592 | 367 |
| 581 | 349 |
| 573 | 339 |
| 566 | 327 |
| 553 | 295 |
| | 272 |
| | 259 |
| | 239 |
| | 219 |
| | 196 |
| | 169 |
| | 145 |
| | 119 |
| | 95 |

TABLE 3

X-ray powder diffractometry
Reflections [° 2 theta]

| DMAc solvate | NMP solvate |
|---|---|
| 8.3 | 8.3 |
| 8.9 | 8.9 |
| 10.4 | 10.5 |
| 11.4 | 11.4 |
| 12.7 | 12.2 |
| 13.8 | 12.7 |
| 14.6 | 13.9 |
| 15.5 | 14.6 |

TABLE 3-continued

X-ray powder diffractometry Reflections [° 2 theta]

| DMAc solvate | NMP solvate |
|---|---|
| 16.0 | 15.4 |
| 16.6 | 15.9 |
| 16.9 | 16.4 |
| 17.3 | 17.0 |
| 18.0 | 17.4 |
| 18.1 | 17.6 |
| 19.1 | 18.2 |
| 19.5 | 19.2 |
| 19.6 | 20.0 |
| 20.0 | 20.4 |
| 21.4 | 21.4 |
| 22.0 | 22.1 |
| 22.2 | 22.5 |
| 22.5 | 23.1 |
| 23.2 | 24.6 |
| 24.5 | 25.4 |
| 24.8 | 25.9 |
| 25.5 | 26.3 |
| 26.3 | 27.6 |
| 27.6 | 28.7 |
| 28.7 | 29.4 |

TABLE 4

IR and Raman bands

| DMAc solvate IR bands [cm$^{-1}$] | NMP solvate IR bands [cm$^{-1}$] | DMAc solvate Raman bands [cm$^{-1}$] | NMP solvate Raman bands [cm$^{-1}$] |
|---|---|---|---|
| 3234 | 3234 | 3126 | 3125 |
| 3124 | 3124 | 3076 | 3077 |
| 3078 | 3078 | 3026 | 3024 |
| 2944 | 2971 | 2972 | 2973 |
| 2325 | 2228 | 2935 | 2936 |
| 1677 | 1677 | 2876 | 2887 |
| 1637 | 1637 | 2230 | 2229 |
| 1627 | 1635 | 1685 | 1684 |
| 1593 | 1593 | 1645 | 1643 |
| 1578 | 1578 | 1598 | 1598 |
| 1542 | 1542 | 1564 | 1563 |
| 1525 | 1525 | 1546 | 1546 |
| 1520 | 1520 | 1526 | 1526 |
| 1505 | 1505 | 1470 | 1469 |
| 1496 | 1468 | 1437 | 1437 |
| 1469 | 1456 | 1414 | 1413 |
| 1456 | 1436 | 1378 | 1378 |
| 1436 | 1413 | 1340 | 1342 |
| 1413 | 1340 | 1306 | 1305 |
| 1338 | 1303 | 1279 | 1279 |
| 1303 | 1278 | 1256 | 1256 |
| 1278 | 1218 | 1235 | 1235 |
| 1219 | 1158 | 1217 | 1217 |
| 1158 | 1080 | 1150 | 1150 |
| 1080 | 1057 | 1128 | 1127 |
| 1057 | 1044 | 1081 | 1080 |
| 1044 | 1027 | 1060 | 1060 |
| 1023 | 1022 | 1044 | 1044 |
| 1016 | 1016 | 1022 | 1022 |
| 926 | 926 | 963 | 963 |
| 894 | 895 | 926 | 928 |
| 851 | 848 | 893 | 893 |
| 821 | 821 | 821 | 821 |
| 799 | 799 | 799 | 801 |
| 771 | 771 | 768 | 765 |
| 752 | 752 | 740 | 739 |
| 694 | 697 | 703 | 711 |
| 651 | 651 | 653 | 694 |
| 625 | 625 | 629 | 628 |
| 589 | 594 | 593 | 593 |
| 472 | 470 | 536 | 537 |
| 424 | 424 | 493 | 494 |
|  |  | 471 | 472 |
|  |  | 446 | 446 |
|  |  | 424 | 424 |
|  |  | 384 | 382 |
|  |  | 352 | 353 |
|  |  | 329 | 328 |
|  |  | 263 | 262 |

TABLE 5

Filtration resistance α

|  | Crystalline form | DMAc solvate |
|---|---|---|
| Filtration resistance α (in m$^{-2}$): | 3.0-7.0*10$^{13}$ | 3.8*10$^{11}$ |

The invention claimed is:

1. A large-scale industrial production process for preparing a compound of formula (I):

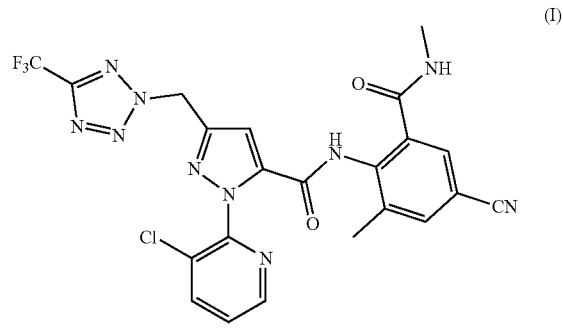 [SMILES: CNC(=O)c1cc(C#N)cc(C)c1NC(=O)c1cc(Cn2nnc(C(F)(F)F)n2)nn1-c1ncccc1Cl]

in crystalline form, comprising:

dissolving a compound of formula (I) in at least one amide solvent, wherein the at least one amide solvent is selected from the group consisting of N,N-dimethylformamide, N,N-dimethylacetamide, N-methylformanilide, N-methyl-2-pyrrolidone, N-methylcaprolactam and hexamethylphosphoramide;

crystallizing the compound to give a solvate in the presence of at least one antisolvent and at a decreased temperature, wherein the at least one antisolvent is selected from the group consisting of acetonitrile, $C_1$-$C_6$ alcohols, toluene, xylene, esters of formic acid with $C_1$-$C_4$ alcohols and esters of acetic acid with $C_1$-$C_4$ alcohols; and subsequently filtering and drying the compound.

2. The process of claim 1, wherein the weight ratio of the at least one amide solvent to the at least one antisolvent is between 10:1 and 1:1.

3. The process of claim 1, wherein the solvate crystallization is carried out at temperatures of −20 to +30° C.

4. The process of claim 1, wherein the compound of formula (I) is prepared in an amide solvent by:

reacting a compound of formula (II):

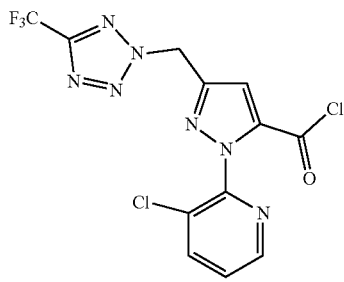

(II)

with a compound of formula (III):

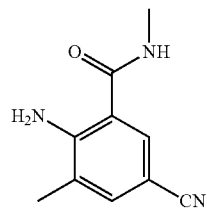

(III)

in the presence of an amide solvent.

5. The process of claim 4, wherein the compound of formula (II) is prepared by:

reacting a compound of formula (IV):

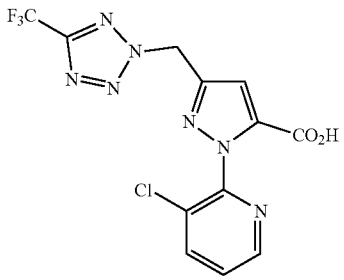

(IV)

with an acid halide former selected from the group consisting of phosgene, phosphorus tribromide, phosphorus trichloride, phosphorus pentachloride, phosphorus oxychloride and thionyl chloride in the presence of an inert organic solvent.

6. A crystalline N,N-dimethylacetamide solvate of a compound of formula (I):

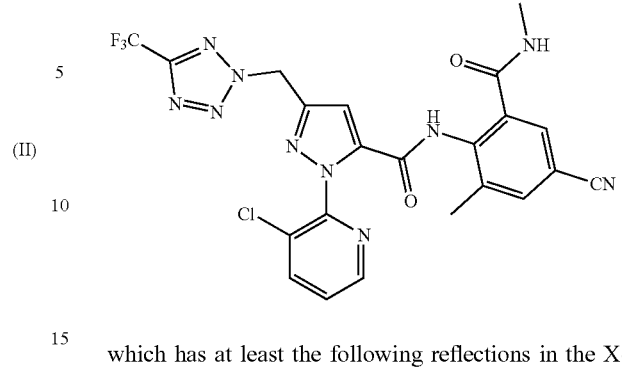

(I)

which has at least the following reflections in the X-ray powder diffractogram at a temperature of 25° C. using Cu Kα radiation: 8.3, 8.9, 14.6 (specified as ° 2 theta value±0.2°).

7. The crystalline N,N-dimethylacetamide solvate of a compound of formula (I) according to claim 6, wherein the Raman spectrum thereof has at least the following bands: 3126, 1685, 1340 (specified as band [cm$^{-1}$]; in each case±2° cm$^{-1}$).

8. A crystalline N-methyl-2-pyrrolidone solvate of a compound of formula (I):

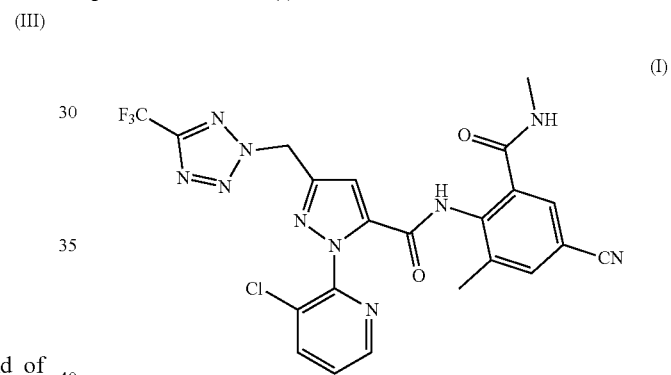

(I)

which has at least the following reflections in the X-ray powder diffractogram at a temperature of 25° C. using Cu Kα radiation: 8.3, 8.9, 14.6 (specified as ° 2 theta value±0.2°).

9. The crystalline N-methyl-2-pyrrolidone solvate of a compound of formula (I) according to claim 8, wherein the Raman spectrum thereof has at least the following bands: 3125, 1684, 1342 (specified as band [cm$^{-1}$]; in each case±2° cm$^{-1}$).

10. A process for preparing a compound of formula (I):

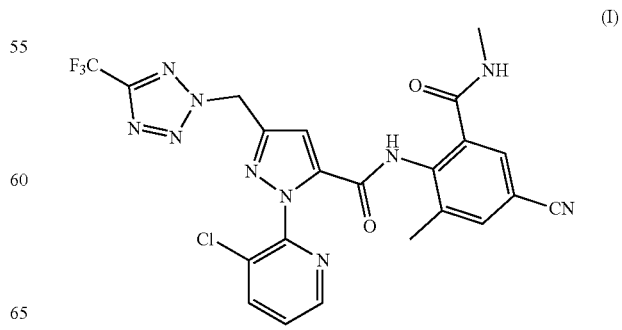

(I)

in crystalline form, comprising:
obtaining the compound of formula (I) in crystalline form from
a) a crystalline N,N-dimethylacetamide solvate of a compound of formula (I) which has at least the following reflections in the X-ray powder diffractogram at a temperature of 25° C. using Cu Kα radiation: 8.3, 8.9, 14.6 (specified as ° 2 theta value±0.2°); and/or
a crystalline N-methyl-2-pyrrolidone solvate of a compound of formula (I) which has at least the following reflections in the X-ray powder diffractogram at a temperature of 25° C. using Cu Kα radiation: 8.3, 8.9, 14.6 (specified as ° 2 theta value±0.2°).

11. The process of claim 1, wherein the crystalline form of the compound of formula (I) has an X-ray powder diffractogram at a temperature of 25° C. and using Cu Kα radiation having at least the following reflections (2 theta): 5.8°, 6.4°, 11.6°, 17.5°, 19.8°, 20.8°, 23.5° and 24.2° (in each case±0.2°).

12. The process of claim 1, wherein the crystalline form of the compound of formula (I) has a Raman spectrum having at least the following bands [cm$^{-1}$]: 2928, 1663, 1386, 1334, 1022, 638 (in each case±2° cm$^{-1}$).

13. The process of claim 1, wherein the crystalline form of the compound of formula (I) has an IR spectrum having at least the following bands [cm$^{-1}$]: 3286, 1662, 1219, 1181, 1154, 1055 (in each case±2° cm$^{-1}$).

14. The process of claim 10, wherein the crystalline form of the compound of formula (I) has an X-ray powder diffractogram at a temperature of 25° C. and using Cu Kα radiation having at least the following reflections (2 theta): 5.8°, 6.4°, 11.6°, 17.5°, 19.8°, 20.8°, 23.5° and 24.2° (in each case±0.2°).

15. The process of claim 10, wherein the crystalline form of the compound of formula (I) has a Raman spectrum having at least the following bands [cm$^{-1}$]: 2928, 1663, 1386, 1334, 1022, 638 (in each case±2° cm$^{-1}$).

16. The process of claim 10, wherein the crystalline form of the compound of formula (I) has an IR spectrum having at least the following bands [cm$^{-1}$]: 3286, 1662, 1219, 1181, 1154, 1055 (in each case±2° cm$^{-1}$).

17. The process of claim 10, wherein
the crystalline N,N-dimethylacetamide solvate of a compound of formula (I) has at least the following bands in the Raman spectrum thereof: 3126, 1685, 1340 (specified as band [cm$^{-1}$]; in each case±2° cm$^{-1}$); and/or
the crystalline N-methyl-2-pyrrolidone solvate of a compound of formula (I), has at least the following bands in the Raman spectrum thereof: 3125, 1684, 1342 (specified as band [cm$^{-1}$]; in each case±2° cm$^{-1}$).

* * * * *